United States Patent
Ho et al.

(10) Patent No.: US 7,917,781 B2
(45) Date of Patent: Mar. 29, 2011

(54) UNIVERSAL USB POWER SUPPLY

(75) Inventors: Lien-Hsun Ho, Taipei (TW); Yi-Chang Chou, Taipei (TW); Chun-Shih Yi, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 398 days.

(21) Appl. No.: 12/232,030

(22) Filed: Sep. 10, 2008

(65) Prior Publication Data
US 2010/0064148 A1    Mar. 11, 2010

(51) Int. Cl.
G06F 1/26 (2006.01)
G06F 1/32 (2006.01)
G06F 13/14 (2006.01)

(52) U.S. Cl. ......... 713/300; 710/305
(58) Field of Classification Search ......... 713/300
See application file for complete search history.

(56) References Cited

U.S. PATENT DOCUMENTS

| | | | |
|---|---|---|---|
| 6,936,936 B2 * | 8/2005 | Fischer et al. | 307/151 |
| 7,581,970 B2 * | 9/2009 | Englund | 439/171 |
| 7,679,317 B2 * | 3/2010 | Veselic | 320/107 |
| 7,701,168 B2 * | 4/2010 | Thijssen | 320/111 |
| 2003/0054703 A1 * | 3/2003 | Fischer et al. | 439/894 |
| 2005/0174094 A1 * | 8/2005 | Purdy et al. | 320/134 |
| 2006/0181241 A1 * | 8/2006 | Veselic | 320/107 |
| 2009/0128091 A1 * | 5/2009 | Purdy et al. | 320/106 |
| 2009/0130874 A1 * | 5/2009 | Englund | 439/131 |
| 2009/0184688 A1 * | 7/2009 | Kim et al. | 320/162 |
| 2010/0045258 A1 * | 2/2010 | Irie | 323/304 |
| 2010/0049997 A1 * | 2/2010 | Tu | 713/300 |
| 2010/0127864 A1 * | 5/2010 | Veselic | 340/540 |
| 2010/0201308 A1 * | 8/2010 | Lindholm | 320/107 |

OTHER PUBLICATIONS

"Battery Charging Specification"; Revision 1.0; Mar. 8, 2007; all pages.*

* cited by examiner

Primary Examiner — Ryan M Stiglic
(74) Attorney, Agent, or Firm — Bacon & Thomas, PLLC

(57) ABSTRACT

A universal series bus (USB) power supply has a DC power source, a USB power interface and a voltage modulation module. The USB power interface is for connecting to an electronic device that stores a default D+ voltage and a default D− voltage. The voltage modulation module connects to and outputs signals to the D+ and D− terminals of the USB power interface. If voltage levels of the output signals are not respectively identical to the default D+ and D− voltages, the voltage modulation module changes the voltage levels of the signals output to the D+ and D− terminals of the USB power interface until the voltage levels of the output signals are respectively identical to the default D+ and D− voltages. Therefore, the USB power supply may be applied to any kind of electronic device that is charged over a USB interface.

11 Claims, 8 Drawing Sheets

UNIVERSAL USB POWER SUPPLY

BACKGROUND OF THE INVENTION

1. Field of the Invention

The present invention relates to a universal serial bus (USB) power supply, and more particularly to a universal USB power supply that is capable of charging any type of electronic device that is charged over a USB interface.

2. Description of Related Art

A universal serial bus (USB) interface is a commonly used connecting interface. A general USB interface has pin definitions comprising a $V_{BUS}$ terminal, a D+ terminal, a D− terminal and a ground terminal. The $V_{BUS}$ terminal and the ground terminal are used to output DC power if the USB interface connects to a DC power source. The D+ and D− terminals are used to transmit data. Compared with conventional computer connecting buses, the USB interface is capable of transmitting data and providing electric power.

Because of the above-mentioned features, some portable electronic devices are designed to have USB interfaces for connecting to computers and charging the portable electronic devices from the computers. Furthermore, a USB power supply is invented. The USB power supply is connected to the utility power or is connected to a cigar-lighter in a vehicle to obtain AC power or DC power and converts the AC power or DC power into DC powers with 5 volts. A portable electronic device can connect to and be charged by the USB power supply.

However, some manufacturers may want to restrict users to only charge the electronic devices with exclusive USB power supplies. With reference to FIG. 6, the electronic device has a USB interface (31), a power circuit (32), a switch (33) and a charge control unit (34). The power circuit (32) and the switch (33) are connected to the $V_{BUS}$ and ground terminals of the USB interface (31) to form a loop. The charge control unit (34) is connected to the D+ and D− terminals of the USB interface (31) and stores a default D+ voltage and a default D− voltage. For example, the default D+ voltage may be 3.5 volts and the default D− may be 4.1 volts. The electronic device's exclusive USB power supply (40) has a USB interface (41). The D+ and D− terminals of the USB interface (41) in the USB power supply (40) output signals having voltage levels identical to the default D+ and default D− voltages. When the electronic device (30) connects to the exclusive USB power supply (40), the charge control unit (34) in the electronic device (40) detects that the D+ and D− terminals of the USB interface (41) in the USB power supply (40) outputs the signals having voltage levels identical to the default D+ and D− voltages. The charge control unit (33) then controls the switch (33) to connect the loop of the power circuit (32), the $V_{BUS}$ and the ground terminals. Accordingly, the USB power supply (40) starts to charge the electronic device (30) so a current flows from the $V_{BUS}$ terminal of the USB power supply (40), passes through the power circuit (32) of the electronic device (30) and flows back to the ground through the ground terminal of the USB power supply (40). Otherwise, if the charge control unit (34) determines that the D+ and D− terminals of the USB power supply (40) outputs the signals having voltage levels different from the default D+ and D− voltages, the charge control unit (34) will control the switch (33) to cut the loop of the power circuit (32), the $V_{BUS}$ and the ground terminals. Therefore, the USB power supply (40) cannot charge the electronic device (30). Consequently, the electronic device (30) can only be charged by the exclusive USB power supply (40) because the default D+ and D− voltages are business secrets of the manufacturers. To charge the electronic device (30), the user has to buy the electronic device's exclusive USB power supply (40).

To overcome the shortcomings, the present invention provides a universal USB power supply that is capable of charging any type of electronic device to mitigate or obviate the aforementioned problems.

SUMMARY OF THE INVENTION

The main objective of the invention is to provide a universal serial bus (USB) power supply that is capable of charging any type of electronic device.

The USB power supply in accordance with the present invention comprises a DC power source, a USB power interface and a voltage modulation module. The USB power interface is for connecting to an electronic device that stores a default D+ voltage and a default D− voltage. The voltage modulation module connects to and outputs signals to the D+ and D− terminals of the USB power interface. If voltage levels of the output signals are not respectively identical to the default D+ and D− voltages, the voltage modulation module changes the voltage levels of the signals output to the D+ and D− terminals of the USB power interface until the voltage levels of the output signals are respectively identical to the default D+ and D− voltages. Therefore, the USB power supply may be applied to any kind of electronic device that is charged over a USB interface.

Other objectives, advantages and novel features of the invention will become more apparent from the following detailed description when taken in conjunction with the accompanying drawings.

DETAILED DESCRIPTION OF PREFERRED EMBODIMENT

Figure 1:
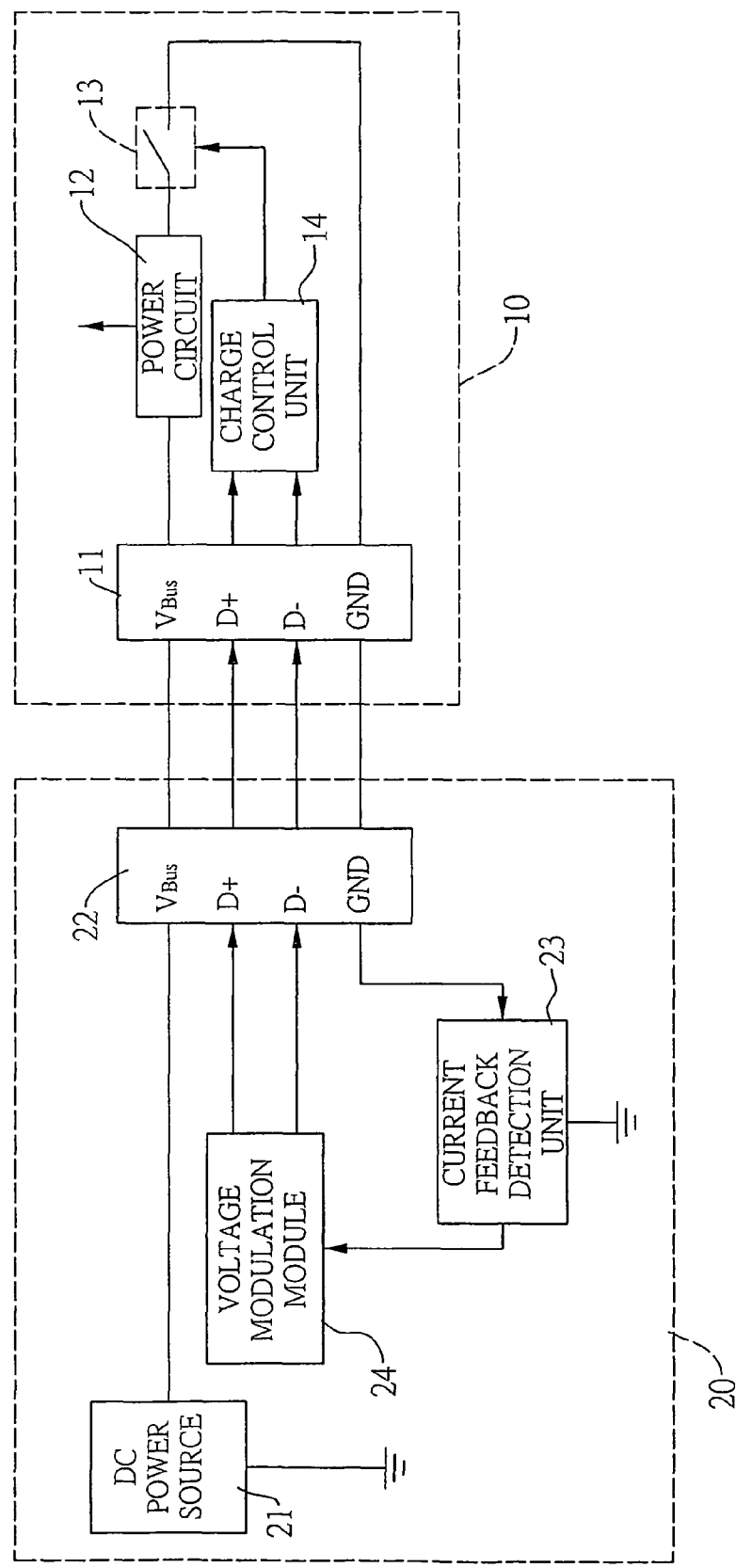
FIG. 1 is a functional block diagram of a universal series bus (USB) power supply in accordance with the present invention and an electronic device.

With reference to FIG. 1, a universal serial bus (USB) power supply in accordance with the present invention connects to an electronic device (10). The electronic device (10) comprises a USB interface (11), a power circuit (12), a switch (13) and a charge control unit (14).

The USB interface (11) has a $V_{BUS}$ terminal, a D+ terminal, a D− terminal and a ground terminal.

The power circuit (12) is connected between the $V_{BUS}$ terminal and the ground terminal of the USB interface (11). The power circuit (12) obtains power from the USB interface (11) and converts the obtained power into operating power for the electronic device (10). Furthermore, the power circuit (12) may be a rechargeable circuit.

The switch (13) is connected between the power circuit (12) and the ground terminals of the USB interface (11).

The charge control unit (14) is connected to the D+ and D− terminals of the USB interface (11) and the switch (13). The charge control unit (14) stores a default D+ voltage and a default D− voltage. For example, the default D+ voltage may be 2.5 voltages and the default D− voltage may be 3.9 volts. When the charge control unit (14) determines that the D+ or D− terminals of the USB interface (11) receive voltages different respectively from the default D+ or D− voltages, the charge control unit (14) controls the switch (13) to cut the loop of the power circuit (12) and the $V_{BUS}$ and the ground terminals of the USB interface (11). Otherwise, the charge control unit (13) controls the switch (13) to connect the loop of the power circuit (12) and the $V_{BUS}$ and the ground terminals of the USB interface (11). Therefore, the electronic device (10) can obtain operating power.

The USB power supply (20) of the present invention may be a USB plug or may be mounted on an external device. A preferred embodiment of the USB power supply (20) comprises a DC power source (21), a USB power interface (22), a current feedback detection unit (23) and a voltage modulation module (24).

If the USB power supply (20) of the present invention is a USB plug connected to the utility power, a car battery or the like, the DC power source (21) is converted from utility power. If the USB power supply (20) of the present invention is mounted on an external device, such as a computer, the DC power source (21) is converted from the utility power by another power supply mounted on the computer.

The USB power interface (22) comprises a $V_{BUS}$ terminal, a D+ terminal, D− terminal and a ground terminal. The $V_{BUS}$ terminal is connected to the DC power source (21) to obtain DC power and is connected to the $V_{BUS}$ terminal of the USB interface (11) on the electronic device (10). The ground terminal is connected to the ground and is connected to the ground terminal of the USB interface (11) on the electronic device (10).

Figure 2:
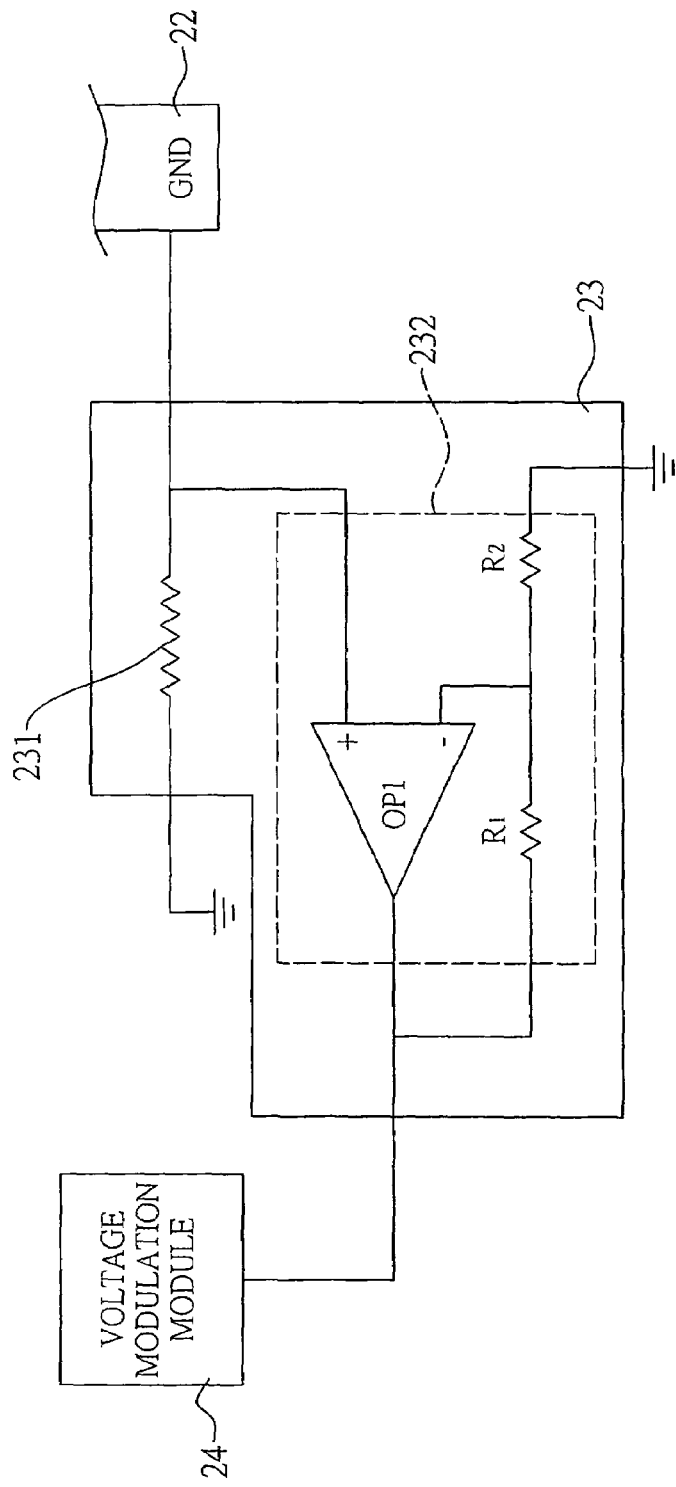
FIG. 2 is a circuit of a current feedback detection unit in FIG. 1.

With further reference to FIG. 2, the current feedback detection unit (23) is connected to the ground and the ground terminal of the USB power interface (22). The current feedback detection unit (23) detects whether the ground terminal of the USB power interface (22) outputs a current and outputs a detection result signal if the ground terminal of the USB power interface (22) outputs a current. The current feedback detection unit (23) may further comprise a feedback resistor (231) and an amplifier (232).

The feedback resistor (231) is connected to the ground and the ground terminal of the USB power interface (22) in series at a series connection node.

The amplifier (232) is connected to the series connection node. If the switch (13) in the electronic device (10) connects the loop of the $V_{BUS}$ terminals of the USB power supply (20) and the electronic device (10), the power circuit (12) in the electronic device (10) and the ground terminals of the electronic device (10) and the USB power supply (20), a current will flow from the ground terminal of the USB power interface (22) to the ground. A feedback voltage will be created when the current flows through the feedback resistor (231). The amplifier (232) magnifies the feedback voltage so the feedback voltage is the detection result signal. A preferred embodiment of the amplifier (232) is a non-inverting amplifier. The non-inverting amplifier comprises a first operational amplifier (OP1) having a positive input terminal, an output terminal and a negative input terminal. The positive input terminal is connected to the series connection node. The output terminal outputs the detection result signal. The negative input terminal is connected to the ground and the output terminal of the first operational amplifier (OP1) respectively over two negative feedback resistors (R1, R2). The detection result signal having a high level voltage represents that there is a current flowing from the ground terminal of the USB power interface (22). Otherwise, the detection result signal has a low level voltage.

Figure 3A:
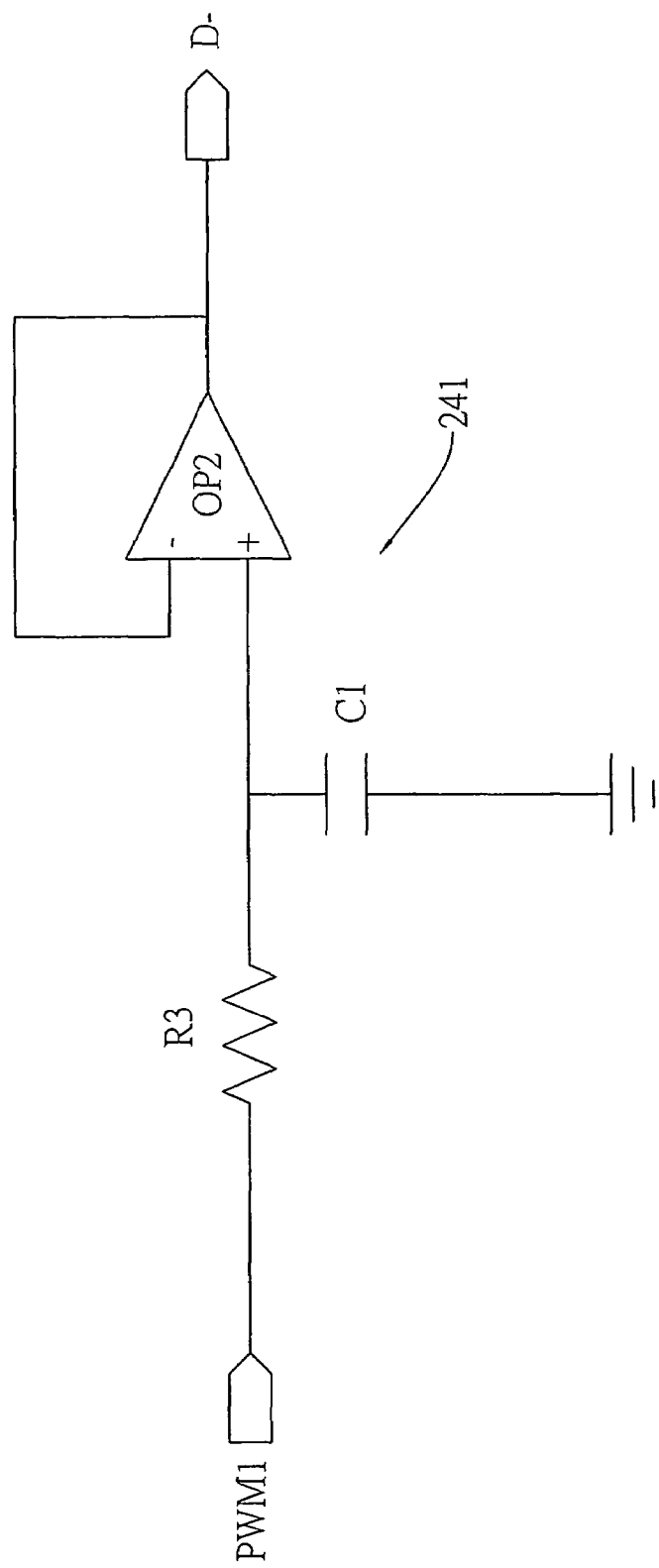
FIGS. 3A and 3B are circuits of non-inverting low pass filters in a voltage modulation module in FIG. 1.
Figure 3B:
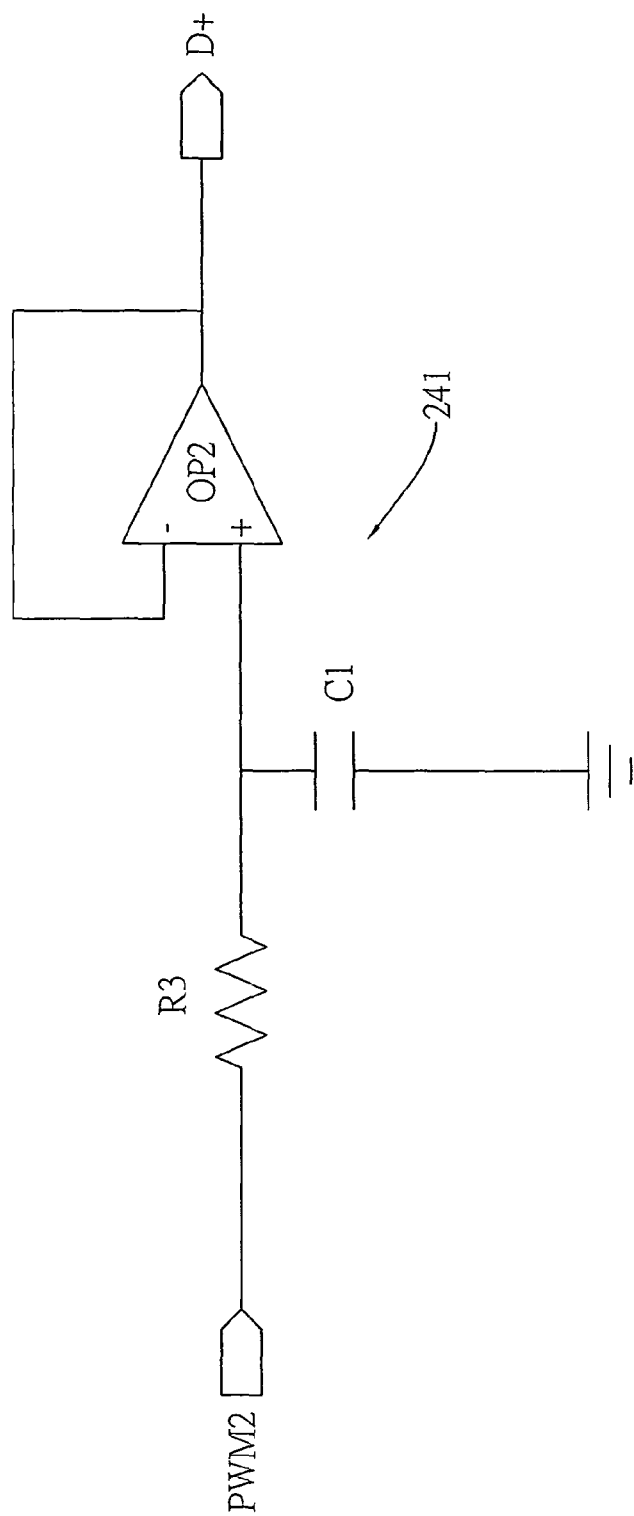
Figure 4:
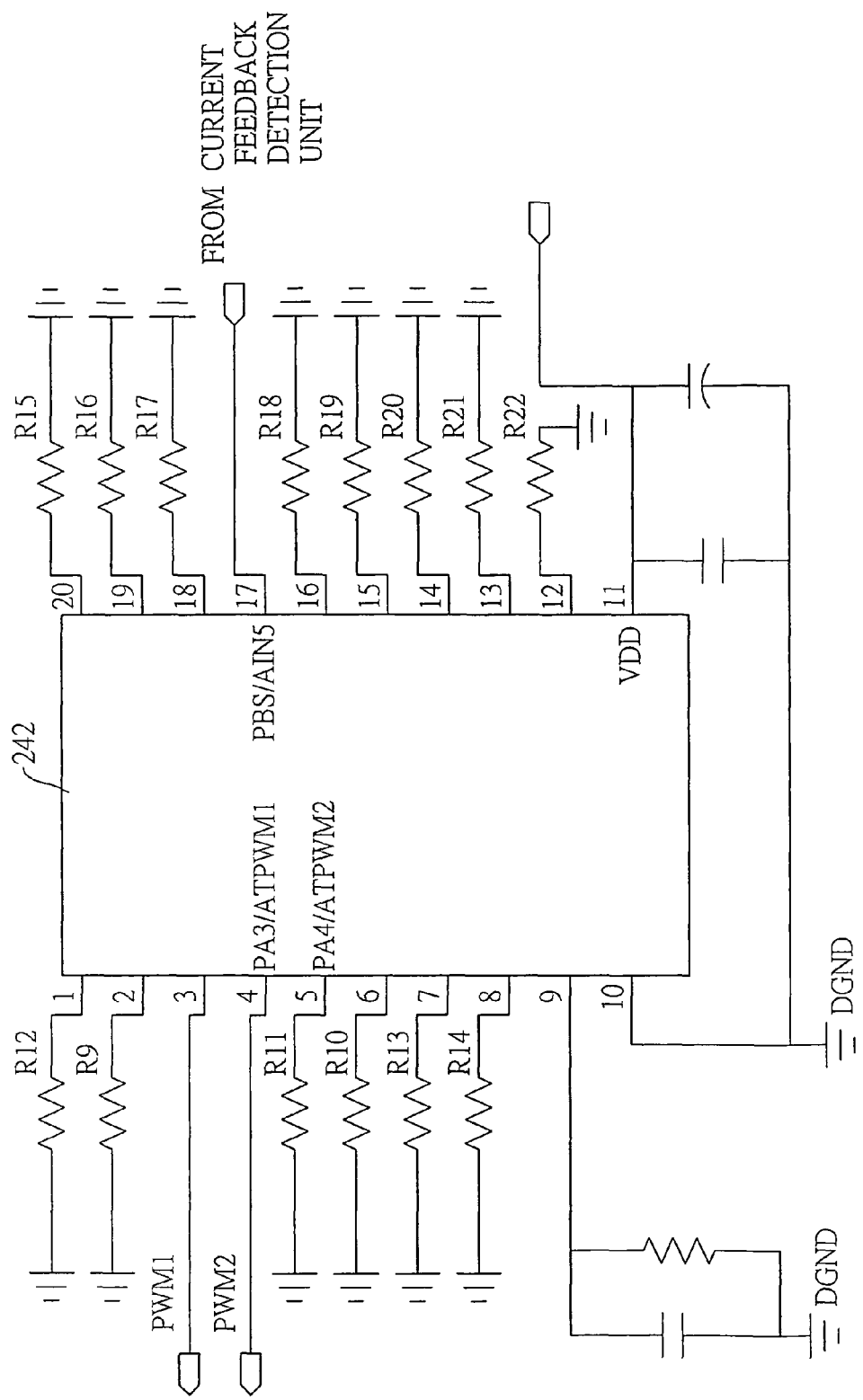
FIG. 4 is a circuit of a processor in the voltage modulation module in FIG. 1.

With further reference to FIGS. 3A, 3B and 4, the voltage modulation module (24) is connected to the current feedback detection unit (23) to receive the detection result signal. The voltage modulation module (24) is connected to and outputs signals to the D+ and D− terminals of the USB power interface (22). The voltage modulation module (24) stores a voltage modulation process. The voltage modulation process controls the voltage levels of the signals output to the D+ and D− terminals of the USB power interface (22) and maintains the voltage levels of the signals when the received detection result signal represents that there is a current flowing from the ground terminal of the USB power interface (22). A preferred embodiment of the voltage modulation module (24) comprises two non-inverting low pass filters (241) and a processor (242).

The non-inverting low pass filters (241) are connected respectively to the D+ and the D− terminals of the USB power interface (22). Each non-inverting low pass filter (241) may further comprise a second operational amplifier (OP2), a first filter capacitor (C1) and a third resistor (R3).

The second operational amplifier (OP2) has an output terminal, a negative input terminal and a positive input terminal. The output terminal is connected to the D+ terminal or the D− terminal of the USB power interface (22). The negative input terminal is connected to the output terminal.

The first filter capacitor (C1) is connected to the positive input terminal of the second operational amplifier (OP2) and the ground.

The third resistor (R3) has a first end and a second end. The first end of the third resistor (R3) is connected to the positive input terminal of the second operational amplifier (OP2).

The processor (242) stores and executes the voltage modulate process and may further store a voltage unit of modulation and a maximum voltage. The voltage unit of modulation may be 0.1 volts or the like, and the maximum voltage may be 4.9 volts or any other value lower than 5 volts. The processor (242) has multiple input terminals and multiple output terminals. One of the input terminals is connected to the current feedback detection unit (23), maybe to the amplifier (232) of the current feedback detection unit (23), to obtain the detection result signal. Two of the output terminals are connected respectively to the non-inverting low pass filters (241), maybe to the second end of the third resistors (R3) of the non-inverting low pass filters (241). The processor (242) outputs positive pulse width modulation (PWM) signals respectively to the non-inverting low pass filters (241). Two positive DC power signals are filtered respectively by the non-inverting low pass filters (241) from the positive PWM signals and are output respectively to the D+ and D− terminals of the USB power interface (22).

Figure 5A:
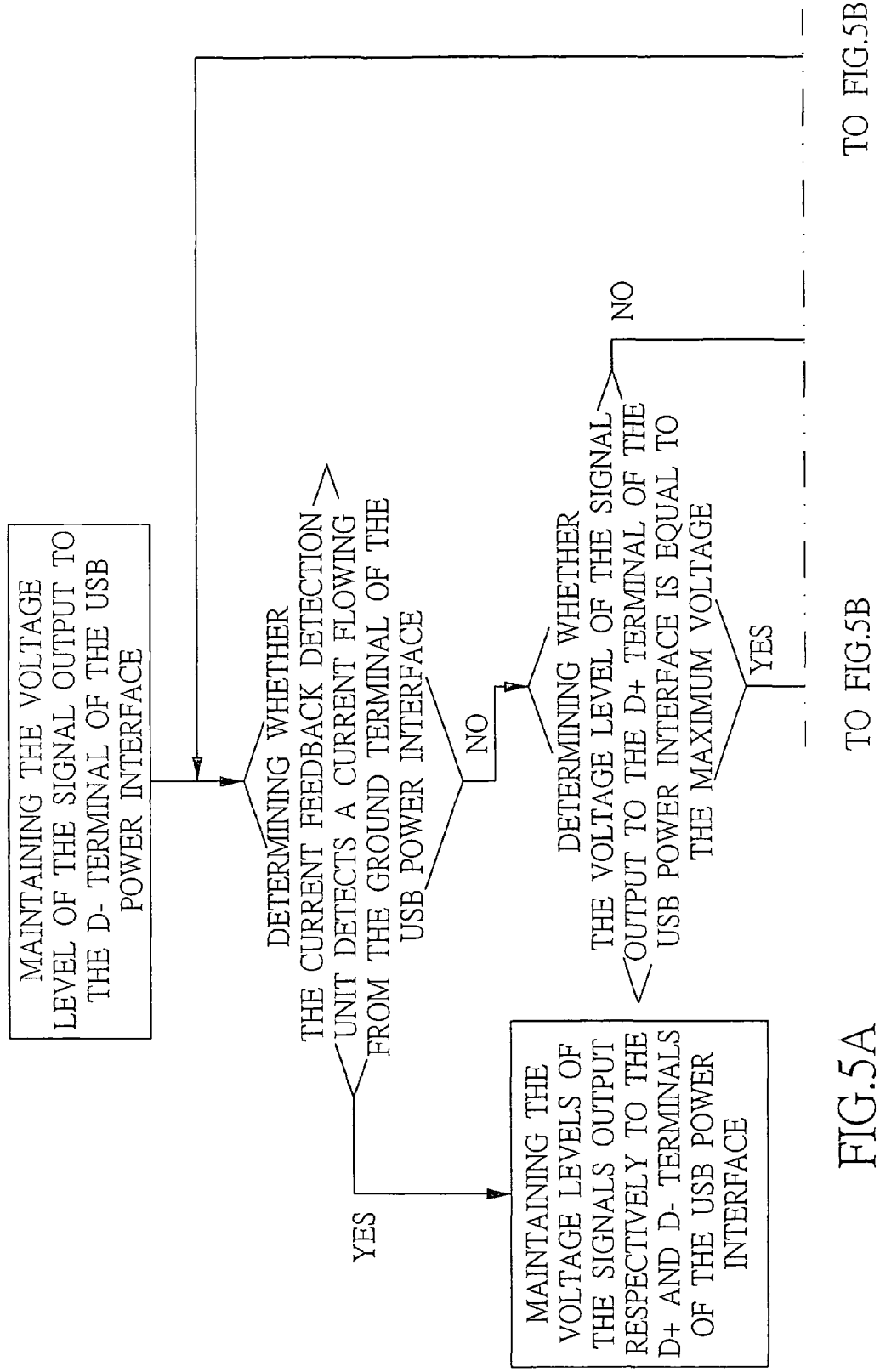
FIGS. 5A and 5B show a flow chart of a voltage modulation process stored in the processor in FIG. 4.
Figure 5B:
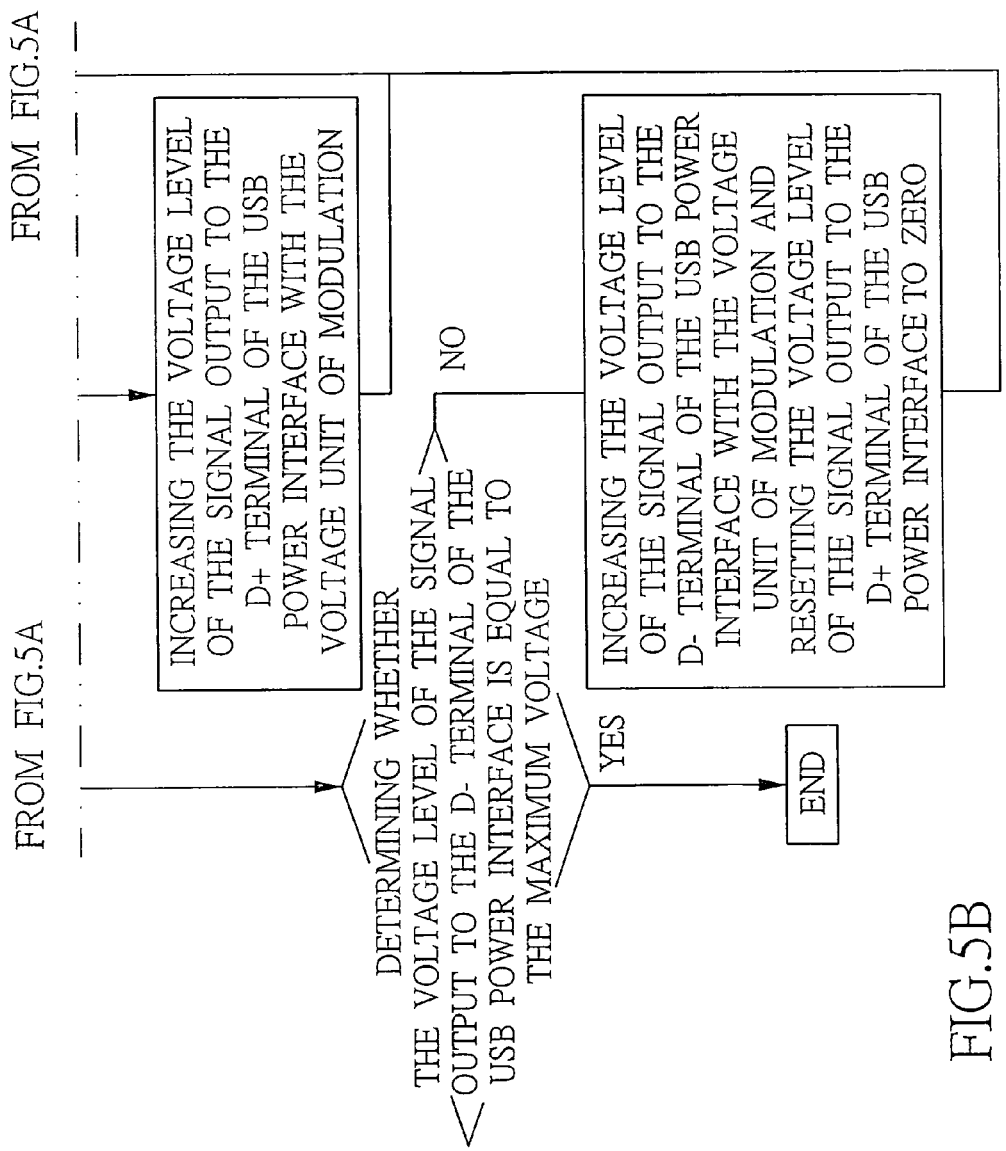
Figure 6:
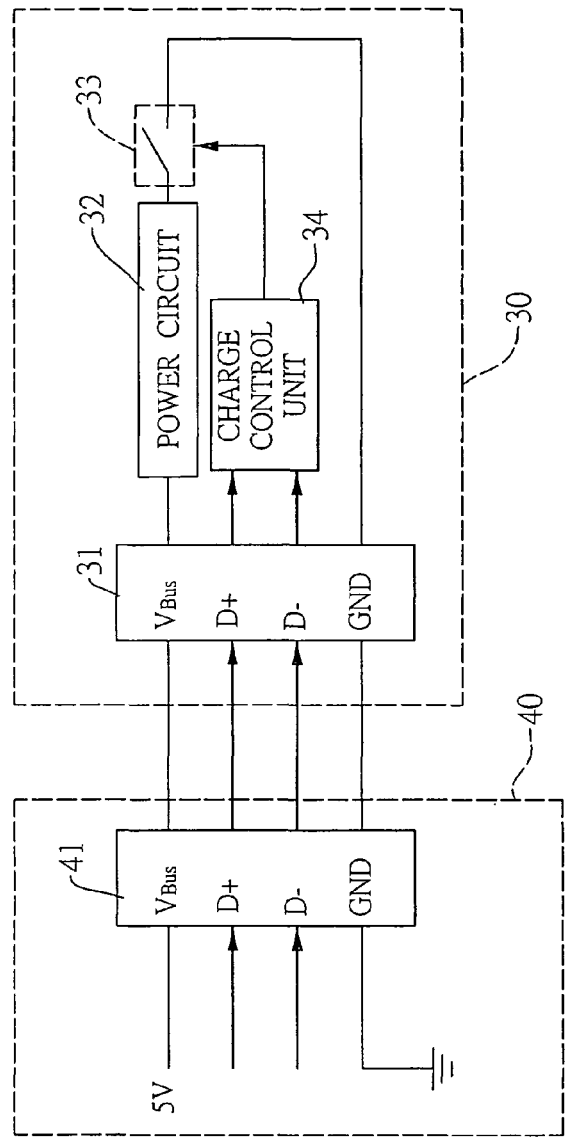
FIG. 6 is a functional block diagram of an electronic device and its exclusive USB power supply in accordance with the prior art.

With further reference to FIGS. 5A and 5B, a preferred embodiment of the voltage modulation process comprises acts of maintaining the voltage level of the signal output to the D− terminal of the USB power interface (501), determining whether the current feedback detection unit detects a current flowing from the ground terminal of the USB power interface (502), determining whether the voltage level of the signal output to the D+ terminal of the USB power interface is equal to the maximum voltage (503), increasing the voltage level of the signal output to the D+ terminal of the USB power interface with the voltage unit of modulation (504), determining whether the voltage level of the signal output to the D− terminal of the USB power interface is equal to the maximum voltage (505), increasing the voltage level of the signal output to the D− terminal of the USB power interface with the voltage unit of modulation (506) and maintaining the voltage levels of the signals output respectively to the D+ and D− terminals of the USB power interface (507). In the act of maintaining the voltage level of the signal output to the D− terminal of the USB power interface (501), the processor (242) maintains the voltage level of the signal output to the D− terminal of the USB power interface (22) at 0 volts.

In the act of determining whether the current feedback detection unit detects a current flowing from the ground terminal of the USB power interface (502), the processor (242) determines whether the current feedback detection (23) detects a current flowing from the ground terminal of the USB power interface (22).

In the act of determining whether the voltage level of the signal output to the D+ terminal of the USB power interface is equal to the maximum voltage (503), the processor (242) determines whether the voltage level of the signal output to the D+ terminal of the USB power interface (22) is equal to the maximum voltage when the current feedback detection (23) does not detect a current flowing from the ground terminal of the USB power interface (22).

In the act of increasing the voltage level of the signal output to the D+ terminal of the USB power interface with the voltage unit of modulation (504), the processor (242) increases the voltage level of the signal output to the D+ terminal of the USB power interface (22) with the voltage unit of modulation when the processor (242) determines that the voltage level of the signal output to the D+ terminal of the USB power interface (22) is not equal to the maximum voltage. The act of determining whether the current feedback detection unit detects a current flowing from the ground terminal of the USB power interface (502) is subsequently re-executed.

In the act of determining whether the voltage level of the signal output to the D− terminal of the USB power interface is equal to the maximum voltage (505), the processor (242) determines whether the voltage level of the signal output to the D− terminal of the USB power interface (22) is equal to the maximum voltage when the voltage level of the signal output to the D+ terminal of the USB power interface (22) is equal to the maximum voltage.

In the act of increasing the voltage level of the signal output to the D− terminal of the USB power interface with the voltage unit of modulation and resetting the voltage level of the signal output to the D+ terminal of the USB power interface to zero (506), the processor (242) increases the voltage level of the signal output to the D− terminal of the USB power interface (22) with the voltage unit of modulation and resets the voltage level of the signal output to the D+ terminal of the USB power interface (22) to zero when the processor (242) determines that the voltage level of the signal output to the D− terminal of the USB power interface (22) is not equal to the maximum voltage. The act of determining whether the current feedback detection unit detects a current flowing from the ground terminal of the USB power interface (502) is subsequently re-executed.

In the act of maintaining the voltage levels of the signals output respectively to the D+ and D− terminals of the USB power interface (507), the processor (242) maintains the voltage levels of the signals output respectively to the D+ and D− terminals of the USB power interface (22) when the processor (242) determines that the current feedback detection unit (23) detects a current flowing from the ground terminal of the USB power interface (22).

No matter what values are the default D+ and D− voltages stored in the electronic device (10), the USB power supply (20) easily finds the correct voltage levels of the signals output to the D+ and D− terminals of the USB power interface (22) by executing the voltage modulation process. Accordingly, the USB power supply (20) charges the electronic device (10). Users need not to buy many USB power supplies for charging the corresponding electronic devices. The USB power supply (10) of the present invention is applied to any kind of electronic device that is charged over a USB interface. A user can use the USB power supply (10) of the present invention to charge all kinds of electronic devices that are charged with USB interfaces.

Even though numerous characteristics and advantages of the present invention have been set forth in the foregoing description, together with details of the structure and function of the invention, the disclosure is illustrative only. Changes may be made in detail, especially in matters of arrangement of parts within the principles of the invention to the full extent indicated by the broad general meaning of the terms in which the appended claims are expressed.

What is claimed is:

1. A universal series bus (USB) power supply comprising:
   a DC power source;
   a USB power interface comprising
     a $V_{BUS}$ terminal being connected to the DC power source to obtain DC power;
     a D+ terminal;
     D− terminal; and
     a ground terminal being connected to the ground;
   a current feedback detection unit being connected to the ground and the ground terminal of the USB power interface, detecting whether the ground terminal of the USB power interface outputs a current and outputting a detection result signal if the ground terminal of the USB power interface outputs a current; and
   a voltage modulation module being connected to the current feedback detection unit and receiving the detection result signal, being connected to and outputting signals to the D+ and D− terminals of the USB power interface, controlling the voltage levels of the signals output to the D+ and D− terminals of the USB power interface and maintaining the voltage levels of the signals when the received detection result signal represents that there is a current flowing from the ground terminal of the USB power interface.

2. The universal USB power supply as claimed in claim 1, wherein the voltage modulation module further comprises:
   two non-inverting low pass filters being connected respectively to the D+ and the D− terminals of the USB power interface; and
   a processor storing and executing a voltage modulate process and having
     multiple input terminals, of which one of the input terminals being connected to the current feedback detection unit to obtain the detection result signal; and
     multiple output terminals, of which two of the output terminals are connected respectively to the non-inverting low pass filters.

3. The universal USB power supply as claimed in claim 1, wherein the current feedback detection unit further comprises:
   a feedback resistor being connected to the ground and the ground terminal of the USB power interface in series at a series connection node, and a feedback voltage is created when the current flows from the ground terminal of the USB power interface through the feedback resistor; and an amplifier being connected to the series connection node and magnifying the feedback voltage so the feedback voltage is the detection result signal.

4. The universal USB power supply as claimed in claim 2, wherein the current feedback detection unit further comprises:

a feedback resistor being connected to the ground and the ground terminal of the USB power interface in series at a series connection node, and a feedback voltage is created when the current flows from the ground terminal of the USB power interface through the feedback resistor; and an amplifier being connected to the series connection node and magnifying the feedback voltage so the feedback voltage is the detection result signal.

5. The universal USB power supply as claimed in claim 3, wherein the amplifier is a non-inverting amplifier.

6. The universal USB power supply as claimed in claim 4, wherein the amplifier is a non-inverting amplifier.

7. The universal USB power supply as claimed in claim 2, wherein the processor further stores a voltage unit of modulation and a maximum voltage; and the voltage modulation process further comprises acts of:
maintaining the voltage level of the signal output to the D− terminal of the USB power interface;
determining whether the current feedback detection unit detects a current flowing from the ground terminal of the USB power interface;
determining whether the voltage level of the signal output to the D+ terminal of the USB power interface is equal to the maximum voltage when the processor determines that the current feedback detection does not detect a current flowing from the ground terminal of the USB power interface;
increasing the voltage level of the signal output to the D+ terminal of the USB power interface with the voltage unit of modulation and re-executing the act of determining whether the current feedback detection unit detects a current flowing from the ground terminal of the USB power interface when the processor determines that the voltage level of the signal output to the D+ terminal of the USB power interface is not equal to the maximum voltage;
determining whether the voltage level of the signal output to the D− terminal of the USB power interface is equal to the maximum voltage when the voltage level of the signal output to the D+ terminal of the USB power interface is equal to the maximum voltage;
increasing the voltage level of the signal output to the D− terminal of the USB power interface with the voltage unit of modulation when the processor determines that the voltage level of the signal output to the D− terminal of the USB power interface is not equal to the maximum voltage and resetting the voltage level of the signal output to the D+ terminal of the USB power interface to zero; and
maintaining the voltage levels of the signals output respectively to the D+ and D− terminals of the USB power interface when the processor determines that the current feedback detection unit detects a current flowing from the ground terminal of the USB power interface.

8. The universal USB power supply as claimed in claim 3, wherein the processor further stores a voltage unit of modulation and a maximum voltage; and the voltage modulation process further comprises acts of:
maintaining the voltage level of the signal output to the D− terminal of the USB power interface;
determining whether the current feedback detection unit detects a current flowing from the ground terminal of the USB power interface;
determining whether the voltage level of the signal output to the D+ terminal of the USB power interface is equal to the maximum voltage when the processor determines that the current feedback detection does not detect a current flowing from the ground terminal of the USB power interface;
increasing the voltage level of the signal output to the D+ terminal of the USB power interface with the voltage unit of modulation and re-executing the act of determining whether the current feedback detection unit detects a current flowing from the ground terminal of the USB power interface when the processor determines that the voltage level of the signal output to the D+ terminal of the USB power interface is not equal to the maximum voltage;
determining whether the voltage level of the signal output to the D− terminal of the USB power interface is equal to the maximum voltage when the voltage level of the signal output to the D+ terminal of the USB power interface is equal to the maximum voltage;
increasing the voltage level of the signal output to the D− terminal of the USB power interface with the voltage unit of modulation when the processor determines that the voltage level of the signal output to the D− terminal of the USB power interface is not equal to the maximum voltage and resetting the voltage level of the signal output to the D+ terminal of the USB power interface to zero; and
maintaining the voltage levels of the signals output respectively to the D+ and D− terminals of the USB power interface when the processor determines that the current feedback detection unit detects a current flowing from the ground terminal of the USB power interface.

9. The universal USB power supply as claimed in claim 4, wherein the processor further stores a voltage unit of modulation and a maximum voltage; and the voltage modulation process further comprises acts of:
maintaining the voltage level of the signal output to the D− terminal of the USB power interface;
determining whether the current feedback detection unit detects a current flowing from the ground terminal of the USB power interface;
determining whether the voltage level of the signal output to the D+ terminal of the USB power interface is equal to the maximum voltage when the processor determines that the current feedback detection does not detect a current flowing from the ground terminal of the USB power interface;
increasing the voltage level of the signal output to the D+ terminal of the USB power interface with the voltage unit of modulation and re-executing the act of determining whether the current feedback detection unit detects a current flowing from the ground terminal of the USB power interface when the processor determines that the voltage level of the signal output to the D+ terminal of the USB power interface is not equal to the maximum voltage;

determining whether the voltage level of the signal output to the D− terminal of the USB power interface is equal to the maximum voltage when the voltage level of the signal output to the D+ terminal of the USB power interface is equal to the maximum voltage;

increasing the voltage level of the signal output to the D− terminal of the USB power interface with the voltage unit of modulation when the processor determines that the voltage level of the signal output to the D− terminal of the USB power interface is not equal to the maximum voltage and resetting the voltage level of the signal output to the D+ terminal of the USB power interface to zero; and maintaining the voltage levels of the signals output respectively to the D+ and D− terminals of the USB power interface when the processor determines that the current feedback detection unit detects a current flowing from the ground terminal of the USB power interface.

10. The universal USB power supply as claimed in claim 5, wherein the processor further stores a voltage unit of modulation and a maximum voltage; and the voltage modulation process further comprises acts of:
  maintaining the voltage level of the signal output to the D− terminal of the USB power interface;
  determining whether the current feedback detection unit detects a current flowing from the ground terminal of the USB power interface;
  determining whether the voltage level of the signal output to the D+ terminal of the USB power interface is equal to the maximum voltage when the processor determines that the current feedback detection does not detect a current flowing from the ground terminal of the USB power interface;
  increasing the voltage level of the signal output to the D+ terminal of the USB power interface with the voltage unit of modulation and re-executing the act of determining whether the current feedback detection unit detects a current flowing from the ground terminal of the USB power interface when the processor determines that the voltage level of the signal output to the D+ terminal of the USB power interface is not equal to the maximum voltage;
  determining whether the voltage level of the signal output to the D− terminal of the USB power interface is equal to the maximum voltage when the voltage level of the signal output to the D+ terminal of the USB power interface is equal to the maximum voltage;
  increasing the voltage level of the signal output to the D− terminal of the USB power interface with the voltage unit of modulation when the processor determines that the voltage level of the signal output to the D− terminal of the USB power interface is not equal to the maximum voltage and resetting the voltage level of the signal output to the D+ terminal of the USB power interface to zero; and
  maintaining the voltage levels of the signals output respectively to the D+ and D− terminals of the USB power interface when the processor determines that the current feedback detection unit detects a current flowing from the ground terminal of the USB power interface.

11. The universal USB power supply as claimed in claim 6, wherein the processor further stores a voltage unit of modulation and a maximum voltage; and the voltage modulation process further comprises acts of:
  maintaining the voltage level of the signal output to the D− terminal of the USB power interface;
  determining whether the current feedback detection unit detects a current flowing from the ground terminal of the USB power interface;
  determining whether the voltage level of the signal output to the D+ terminal of the USB power interface is equal to the maximum voltage when the processor determines that the current feedback detection does not detect a current flowing from the ground terminal of the USB power interface;
  increasing the voltage level of the signal output to the D+ terminal of the USB power interface with the voltage unit of modulation and re-executing the act of determining whether the current feedback detection unit detects a current flowing from the ground terminal of the USB power interface when the processor determines that the voltage level of the signal output to the D+ terminal of the USB power interface is not equal to the maximum voltage;
  determining whether the voltage level of the signal output to the D− terminal of the USB power interface is equal to the maximum voltage when the voltage level of the signal output to the D+ terminal of the USB power interface is equal to the maximum voltage;
  increasing the voltage level of the signal output to the D− terminal of the USB power interface with the voltage unit of modulation when the processor determines that the voltage level of the signal output to the D− terminal of the USB power interface is not equal to the maximum voltage and resetting the voltage level of the signal output to the D+ terminal of the USB power interface to zero; and
  maintaining the voltage levels of the signals output respectively to the D+ and D− terminals of the USB power interface when the processor determines that the current feedback detection unit detects a current flowing from the ground terminal of the USB power interface.

* * * * *